United States Patent
Rolfsvåg (10) Patent No.: US 11,035,222 B2
(45) Date of Patent: Jun. 15, 2021

(54) PROBE ARRANGEMENT FOR PRESSURE MEASUREMENT OF A WATER PHASE INSIDE A HYDROCARBON RESERVOIR

(71) Applicant: HYDROPHILIC AS, Tananger (NO)

(72) Inventor: Trond Arne Rolfsvåg, Tananger (NO)

(73) Assignee: HYDROPHILIC AS, Tananger (NO)

( * ) Notice: Subject to any disclaimer, the term of this patent is extended or adjusted under 35 U.S.C. 154(b) by 14 days.

(21) Appl. No.: 16/465,108

(22) PCT Filed: Nov. 29, 2017

(86) PCT No.: PCT/NO2017/050308
§ 371 (c)(1),
(2) Date: May 29, 2019

(87) PCT Pub. No.: WO2018/101838
PCT Pub. Date: Jun. 7, 2018

(65) Prior Publication Data
US 2019/0323339 A1    Oct. 24, 2019

(30) Foreign Application Priority Data

Nov. 30, 2016  (NO) .................................. 20161910

(51) Int. Cl.
*E21B 47/06* (2012.01)
*E21B 49/10* (2006.01)
*G01L 19/00* (2006.01)

(52) U.S. Cl.
CPC .............. *E21B 47/06* (2013.01); *E21B 49/10* (2013.01); *G01L 19/0007* (2013.01)

(58) Field of Classification Search
CPC ........ E21B 49/10; E21B 49/087; E21B 47/06; G01L 19/0007
See application file for complete search history.

(56) References Cited

U.S. PATENT DOCUMENTS 3,572,121 A    3/1971  Kesseru et al.
3,653,436 A *  4/1972  Anderson ............... E21B 49/10
                                                166/100
(Continued)

FOREIGN PATENT DOCUMENTS

CA    2522259 A1 *  4/2006  ............. E21B 49/10
GB    2433760 A  *  7/2007  ............. E21B 49/06
(Continued)

OTHER PUBLICATIONS

Norwegian Search Report for Application No. 20161910, dated Jun. 28, 2017 in 2 pages.
(Continued)

*Primary Examiner* — Jennifer H Gay
(74) *Attorney, Agent, or Firm* — Knobbe, Martens, Olson & Bear, LLP (57) ABSTRACT

A probe (3) and a probe arrangement (1) for a pressure measurement of a water phase inside a hydrocarbon reservoir (12). The probe (3) comprises a body (5) comprising a pressure measuring chamber (7) and at least one opening (10) to the pressure measuring chamber (7), and a surface of the body (5) is arranged with a hydrophilic characteristic. The probe arrangement comprises a displacement mechanism (46) adapted to displace the probe from a first position, where the opening of the probe is located outside the reservoir, to a second position, where said at least one opening (10) of the probe (3) is located at a position inside the reservoir (12).

13 Claims, 9 Drawing Sheets

(56) References Cited

U.S. PATENT DOCUMENTS

| | | | |
|---|---|---|---|
| 3,934,468 A * | 1/1976 | Brieger | E21B 49/10 |
| | | | 73/152.25 |
| 4,282,750 A | 8/1981 | Prats et al. | |
| 4,369,654 A * | 1/1983 | Hallmark | E21B 49/10 |
| | | | 73/152.26 |
| 4,438,654 A | 3/1984 | Torstensson | |
| 4,936,139 A * | 6/1990 | Zimmerman | E21B 49/08 |
| | | | 175/40 |
| 5,621,169 A | 4/1997 | Harris et al. | |
| 5,770,798 A * | 6/1998 | Georgi | E21B 49/008 |
| | | | 73/152.05 |
| 6,164,126 A * | 12/2000 | Ciglenec | E21B 49/10 |
| | | | 73/152.01 |
| 6,167,968 B1 * | 1/2001 | Allarie | E21B 4/02 |
| | | | 166/298 |
| 6,693,553 B1 * | 2/2004 | Ciglenec | E21B 23/14 |
| | | | 340/853.1 |
| 7,178,392 B2 * | 2/2007 | Dhruva | E21B 49/008 |
| | | | 73/152.51 |
| 7,347,262 B2 * | 3/2008 | Tarvin | E21B 49/10 |
| | | | 166/100 |
| 8,408,296 B2 * | 4/2013 | Edwards | E21B 47/06 |
| | | | 166/250.1 |
| 8,471,560 B2 * | 6/2013 | Freedman | G01V 3/18 |
| | | | 324/303 |
| 8,794,318 B2 * | 8/2014 | Harrigan | E21B 49/10 |
| | | | 166/264 |
| 8,991,245 B2 * | 3/2015 | Fields | E21B 49/10 |
| | | | 73/152.41 |
| 9,004,193 B2 * | 4/2015 | Lavrut | E21B 41/0035 |
| | | | 175/50 |
| 2005/0039527 A1 * | 2/2005 | Dhruva | E21B 49/008 |
| | | | 73/152.27 |
| 2005/0279499 A1 * | 12/2005 | Tarvin | E21B 49/10 |
| | | | 166/264 |
| 2006/0000606 A1 * | 1/2006 | Fields | E21B 49/10 |
| | | | 166/264 |
| 2007/0062695 A1 * | 3/2007 | Harrison | E21B 47/10 |
| | | | 166/250.11 |
| 2007/0205021 A1 * | 9/2007 | Pelletier | E21B 49/10 |
| | | | 175/59 |
| 2008/0121394 A1 * | 5/2008 | Tarvin | E21B 49/10 |
| | | | 166/264 |
| 2009/0194279 A1 * | 8/2009 | Tarvin | E21B 49/10 |
| | | | 166/264 |
| 2011/0198078 A1 * | 8/2011 | Harrigan | E21B 49/087 |
| | | | 166/254.2 |
| 2012/0043080 A1 * | 2/2012 | Edwards | E21B 43/26 |
| | | | 166/264 |
| 2012/0199368 A1 | 8/2012 | Freyer | |
| 2019/0145252 A1 * | 5/2019 | Naveena-Chandran | |
| | | | E21B 49/006 |
| | | | 166/250.17 |
| 2019/0323339 A1 * | 10/2019 | Rolfsvag | E21B 47/06 |

FOREIGN PATENT DOCUMENTS

| | | | | |
|---|---|---|---|---|
| GB | 2442110 A * | 3/2008 | | E21B 49/10 |
| SU | 839448 A3 | 6/1981 | | |
| SU | 1305334 A1 | 4/1987 | | |
| WO | 01/09483 A1 | 2/2001 | | |
| WO | WO-2010008994 A2 * | 1/2010 | | E21B 49/008 |
| WO | WO-2013023299 A1 * | 2/2013 | | G01J 3/4406 |

OTHER PUBLICATIONS

International Preliminary Report on Patentability for PCT Application No. PCT/NO2017/050308, dated Feb. 22, 2019 in 9 pages.
PCT Search Report for PCT Application No. PCT/NO2017/050308, dated Feb. 5, 2018 in 3 pages.
Russian Search Report for Russian Patent Application No. 2019115677/03(029861), dated Mar. 12, 2021 in 4 pages including English translation.

* cited by examiner

PROBE ARRANGEMENT FOR PRESSURE MEASUREMENT OF A WATER PHASE INSIDE A HYDROCARBON RESERVOIR

INTRODUCTION

The present invention relates to a probe arrangement comprising a probe for a selective pressure measurement of a water phase inside a hydrocarbon reservoir. The probe comprises a body comprising a pressure measuring chamber and at least one opening to the pressure measuring chamber for introduction of water from the water phase to the pressure measuring chamber. The probe is arranged so that at least a portion of a surface of the body at the at least one opening is provided with a hydrophilic characteristic.

The probe and the probe arrangement are to be used for such measurements for the purpose of calculation of a free water level between a hydrocarbon phase and the water phase and an estimation of remaining spontaneous imbibition potential. The present invention also relates to a method for positioning a probe within the hydrocarbon reservoir for such measurements.

PRIOR ART

Determination of the free water level between the hydrocarbon phase and the water phase on basis of pressure measurements is known in prior art. A standard—non-selective—probe can be used to capture pressure at several depths in the reservoir, both in the hydrocarbon column and in the water below the hydrocarbon column. The pressure points from the water zone will form a straight line, and the oil, or gas, column above will form another straight line. The free water level is the depth at which the two lines cross.

A problem with prior art pressure measurements to define the free water level of a reservoir is that a plurality of measurements must be made at different depths in the reservoir. Pressure measurements must be done both inside the hydrocarbon saturated part of the reservoir and in the aquifer below the free water level.

If a hydrocarbon zone is thin, the standard method of collecting several pressure points at different depths will not provide an accurate result. If the reservoir is layered, or segmented, it could be uncertain if the pressures measured in the hydrocarbon phase and the water phase belong to the same reservoir unit.

In-situ pressure measurements that can be used for estimating remaining spontaneous imbibition potential have not been done before. Remaining spontaneous imbibition potential are currently estimated by simulation models and/or based on water saturation measurements. Existing methods are more uncertain than an estimate based on an in-situ capillary pressure measurement would be.

WO01/09483A1 discloses a probe and a method for determining the depth of a fluid contact level between two fluids. U.S. Pat. No. 6,164,126A discloses an apparatus and a method for measurement on a subsurface formation. U.S. Pat. No. 4,438,654A discloses a device for taking samples of ground water in soil and rock. US2012199368A discloses a method and device for deploying a cable and an apparatus in a ground formation.

SUMMARY OF THE INVENTION

The invention has for its object to remedy or to reduce at least one of the drawbacks of the prior art, or at least provide a useful alternative to prior art. In particular, an object of the invention is to provide an improved probe, probe arrangement and method for pressure measurement of a water phase at a hydrocarbon reservoir.

This object is achieved by means of a probe arrangement according to the invention for pressure measurement of a water phase inside a hydrocarbon reservoir. The probe arrangement comprises a probe comprising a body with a pressure measuring chamber and at least one opening to the pressure measuring chamber for contacting water from the water phase with the pressure measuring chamber, wherein at least a portion of a surface of the body at said at least one opening is arranged with a hydrophilic characteristic.

The probe arrangement is characterized in that the at least one opening comprises a diameter or equivalent diameter in the range of 0.01-0.000001 mm, preferably 0.01-0.00001 mm, more preferably 0.005-0.00001 mm, and the probe arrangement a displacement mechanism adapted to displace the probe from a first position, where said at least one opening of the probe is located outside the reservoir, to a second position, where said at least one opening of the probe is located at a position inside the reservoir.

The displacement mechanism enables the probe to be displace from the first position outside the reservoir to the second position inside the reservoir. Furthermore, the displacement mechanism is configured to displace the probe into the reservoir to the second position beyond a contaminated zone where in which surface active components are in high concentration.

In particular, the first position is a position within a well in the reservoir. The second position is defined as position within the reservoir. At the second position, measurement of the water phase is possible without deterioration of the hydrophilic characteristic of the probe.

According to an embodiment of the invention, in the second position, said at least one opening of the probe is located at a position inside the reservoir in which surface active components have a concentration less than 0.1 millimole/litre.

At the second position, measurement of the water phase is possible without deterioration of the hydrophilic characteristic of the probe. The contaminated zone is defined as a zone in which surface active components have a concentration equal or higher than 0.1 millimole/litre. According to an embodiment of the invention, in the second position, said at least one opening of the probe is located at a position inside the reservoir in which a change from an initial water saturation in the reservoir is less than 1%.

The drilling operation into the reservoir forms a contaminated zone. Furthermore, the water phase was perturbed at the drilling operation of the well in the reservoir, thereby forming a disturbed zone. For the purpose of the measurement of the water phase, the probe is displaced to the second position where the change from an initial water saturation in the reservoir is less than 1%.

According to an embodiment of the invention, in the second position, said at least one opening of the probe is located at least 10 cm into the reservoir, preferably at least 50 cm into the reservoir.

According to an embodiment of the invention, the probe arrangement comprises a tapered displacement head comprising an inner room adapted to enclosing the probe, a first passage to the inner room and a second passage out of the inner room into the reservoir and a sealing member for sealing an opening of said second passage, wherein the displacement head is adapted to be forced into the reservoir and thereby forming an opening in the reservoir.

According to an embodiment of the invention, the probe arrangement comprises a drilling mechanism for forming a further opening in the reservoir. The drilling mechanism is adapted to form a bore into the reservoir passing through the contaminated zone into the disturbed zone. The bore enables the probe to be displaced from the first position to the second position without being contaminated by the surface active components.

According to an embodiment of the invention, the drilling mechanism comprises means for introducing a fluid into the opening and removing the fluid together with residual material from the opening, which fluid is insoluble or essentially insoluble in water. Preferably, the fluid introduced is a fluid mainly comprising oil. By means of introducing and removing the fluid during drilling the bore, it is assured that the second position of the probe is not contaminated by the surface active components.

According to an embodiment of the invention, said inner room of the displacement head is adapted to enclosing a drilling head of the drilling mechanism.

According to an embodiment of the invention, the probe arrangement comprises a casing mechanism adapted to position a casing into said formed opening. By means of arranging casing in the bore formed by the drilling mechanism, it is further assured that the probe can be displaced into the reservoir to the second position without being contaminated by the surface active components when passing through the contaminated zone.

According to an embodiment of the invention, the probe arrangement comprises a pressure sensor arranged in the pressure measuring chamber or in connection with the pressure measuring chamber, and a logic unit adapted to receive information from the pressure sensor and determine a pressure of the water phase (Pw) in the pressure measuring chamber.

According to an embodiment of the invention, the probe arrangement comprises means for displaying the determined pressure of the water in the pressure measuring chamber.

According to an embodiment of the invention, the probe comprises a further sealing member configured to cover said at least one opening from exposure to surface active components at a concentration equal to or higher than 0.1 millimole/litre.

The probe comprises a body comprising a pressure measuring chamber and at least one opening to the pressure measuring chamber for introduction of water from the water phase to the pressure measuring chamber, wherein at least a portion of a surface of the body at said at least one opening is arranged with a hydrophilic characteristic. The probe is characterized in that it comprises a sealing member configured to cover said at least one opening from exposure to surface active components at a displacement of the probe into the reservoir passing through a contaminated zone comprising one or more of the surface active components at a concentration equal to or higher than 0.1 millimole/litre.

The probe is adapted to be inserted into the reservoir rock of the water phase at the hydrocarbon reservoir or to be arranged in contact with the water phase in the hydrocarbon reservoir. In order to contact the water phase of the reservoir at a location in which the water phase has not significant been perturb by a drilling operation, the probe must pass through a contaminated zone comprising surface active components used in the drilling operation. The probe is provided with the sealing member that cover the opening to the probe so that the hydrophilic characteristic is not deteriorated by the surface active components in the contaminated zone. In particular, the sealing member is adapted to protect the opening of the probe from interaction of surface active components at concentration equal to or higher than 0.1 millimole/litre.

Example of surface active components in the contaminated zone is Octadecylamine (15 EO) Quaternary Ammonium Salt (cationic surfactant), Imidazoline (cationic surfactant), Coco Dimethyl Quat (cationic surfactant), Sodium C14-16 Alpha Olephin Sulfonate (anionic surfactant), C10 Alcohol (8 EO) Ethoxylate (non-ionic surfactant), and etcetera.

When the opening of the probe has been arranged at a suitable position within the reservoir, the sealing member is adapted to be removed or penetrated. Thereby, the at least one opening of the probe is brought into contact with the water phase in the reservoir without being influenced by the surface active components in the contaminated zone.

By means of the hydrophilic characteristic of the surface or portion of the surface of the body at the opening or openings, the surface is "water-loving" allowing water to be introduced in to the pressure measuring chamber. Thereby allowing the pressure of the water phase to be measured inside a hydrocarbon saturated reservoir. Accordingly, the probe of the invention enables a selective measurement of the water phase in the hydrocarbon reservoir.

On basis of the measurement, the free water level between the water phase and the hydrocarbon phase of the hydrocarbon reservoir can be calculated from one measuring depth only. The remaining spontaneous imbibition potential at the measuring point in the hydrocarbon reservoir can also be estimated from the pressure difference between the water and the hydrocarbon phase at the measuring point.

The hydrophilic characteristic versus a hydrophobic characteristic are defined by means of a contact angle between a droplet of water and the surface. The hydrophilic characteristic is defined by a surface providing a contact angle between the surface and a water droplet that is less than 90 degrees. Vice versa, the hydrophobic characteristic is a surface providing a contact angle between the surface and the water droplet that is more than 90 degrees.

According to an embodiment of the invention, the further sealing member comprises a casing extending over said at least one opening and mainly comprising a glass material. The glass of the casing provides a sealing that is impermeable to the surface active components in the contaminated zone.

According to an embodiment of the invention, the probe comprises a spacing between the further sealing member and the surface of the body of the probe, and wherein the probe further comprises a flowable suspension with hydrophilic properties arranged in said spacing.

By arranging the spacing between the sealing member and the surface of the body at the at least one opening with the flowable suspension, contact with the water phase is facilitated once the probe has been arranged in a suitable position within the reservoir.

According to an embodiment of the invention, the flowable suspension mainly comprises a granular combination of kaolinite and water.

According to an embodiment of the invention, the at least one opening to the pressure measuring chamber is saturated filled with water.

According to an embodiment of the invention, the at least one opening comprises a diameter or equivalent diameter in the range of 0.01-0.00001 mm, preferably 0.005-0.00001 mm. Small openings are preferable. The reason for the openings to be small is that the non-wetting phase (oil or gas) must curve its interface with the water to be able to flow through the opening. The smaller the opening the higher the pressure differential for the non-wetting phase to flow through the opening will be. The size of the at least one opening refers to the smallest part of the opening to the pressure measuring chamber. The pressure at which the non-wetting phase starts to flow through is often referred to as the threshold pressure.

According to an embodiment of the invention, the surface of the body comprises a hydrophilic porous plate mainly comprising aluminium oxide ($Al_2O_3$), such as CoorsTek P-1/2. Preferably, the surface of the body comprises hydrophilic porous plate of CoorsTek P-1/2 with openings in the range of 0.01-0.001 mm, preferably around 0.003-0.007 mm, which provides a threshold pressure of at least 5 bar for air (non-wetting).

According to an embodiment of the invention, the body comprises a plurality of openings to the measuring chamber. Preferably, the openings are leading to the pressure measuring chamber from different directions.

According to an embodiment of the invention, the body comprises a permeable material with a plurality of pores, and wherein at least a portion of the pores constitutes said openings to the pressure measuring chamber.

Permeable materials could be made of metals, ceramics, minerals, fused particles, woven fibres or naturally occurring permeable materials like a quartz-based sandstone or a carbonate rock. By means of a plurality of openings to the pressure measuring chamber, it is assured that water is introduced into the pressure measuring chamber even if some of the openings are blocked, such as by material in the water phase of the hydrocarbon reservoir.

According to an embodiment of the invention, the surface of the body of the probe comprises mainly a material with a hardness equal to or higher than 130 Brinell. By means of arranging the surface of the body with sufficient hardness, the openings are prevented from being deformed when the probe is introduced in the reservoir.

According to an embodiment of the invention, the surface of the body of the probe mainly comprises one of steel and stainless steel. Steel and stainless steel comprises preferable properties for insertion in the reservoir with maintained function of the probe. Furthermore, the surface of steel and stainless steel may be treated so to provide the hydrophilic characteristic. Treatments that can make steel, and many other surfaces, hydrophilic are commercially available, e.g.: Aculon. The surface treatment can be introduced as a temporary coating or as a permanent new surface layer.

Internal surfaces can also be treated. Alternatively, if a cavity in the wall of a well into the reservoir are made prior to the introduction of the probe, material of lower strength and hardness may be used.

According to an embodiment of the invention, the body of the probe is arranged wedge shaped. Alternatively, the probe has the form of a needle or plate dependent on the composition of the reservoir. By means of the wedge shaped body, the insertion of the probe in the reservoir is facilitated.

According to an embodiment of the invention, the probe further comprises a contact arrangement arranged on at least a portion of the surface of the body, which contact arrangement comprises one or more flexible elongated members extending away from the surface and comprising an envelope surface provided with the hydrophilic characteristic.

The elongated members are bended when the probe is inserted in the rock material of the reservoir so that the elongated members find a contact with the water phase, such as at interface surface between elements in the rock material. Accordingly, by means of the contact arrangement, contact between the probe and the water phase is facilitated.

According to an embodiment of the invention, the one or more elongated members mainly comprise a fibrous material. The fibrous material could be made of natural polymeric fibres such as silk, synthetic polymeric fibres such as aramid and polyethylene, metallic fibres such as steel and tungsten, and ceramic fibres such as alumina and silicon carbide.

The object of the invention is further obtained by means of a method for pressure measurement of a water phase inside a hydrocarbon reservoir according to an embodiment of the invention. The measurement of the method is conducted by means of a probe arrangement according to any of claim 1-13. The method comprises the step of:
  introducing the probe into the reservoir by displacing the probe from a first position, where said at least one opening of the probe is located outside the reservoir, to a second position, where said at least one opening of the probe is located at a position inside the reservoir.

According to an embodiment of the invention, the method further comprises:
  introducing the probe into the reservoir so that said at least one opening of the probe in the second position is located at a position inside the reservoir in which surface active components have a concentration less than 0.1 millimole/litre.

According to an embodiment of the invention, the method further comprises:
  introducing the probe into the reservoir so that said at least one opening of the probe in the second position is located at a position inside the reservoir in which a change from an initial water saturation in the reservoir is less than 1%.

According to an embodiment of the invention, the method further comprises:
  introducing the probe into the reservoir so that said at least one opening of the probe in the second position is located at least 10 cm into the reservoir, preferably at least 50 cm into the reservoir.

According to an embodiment of the invention, the method further comprises:
  forming an opening into the reservoir by forcing the tapered displacement head into the reservoir, and
  removing or penetrating the sealing member.

According to an embodiment of the invention, the method further comprises:
  forming a further opening into the reservoir by means of the drilling mechanism, and
  introducing the probe into the further opening and into the reservoir.

The object of the invention is further obtained by means of a method for pressure measurement of a water phase inside a hydrocarbon reservoir according to a further embodiment of the invention. The measurement of the method is conducted by means of a probe comprising a body comprising a pressure measuring chamber and at least one opening to the pressure measuring chamber for introduction of water from the water phase to the pressure measuring chamber, wherein at least a portion of a surface of the body at said at least one opening is arranged with a hydrophilic characteristic. The method comprises the step of:
  forming an opening into the reservoir,
  positioning the said at least one opening of the probe at a first position in vicinity to the reservoir, in which first position said at least one opening is located outside the reservoir, displacing the probe from the first position to a second position in which said at least one opening is located inside the reservoir, wherein in the second position said at least one opening of the probe is located at a position inside the reservoir in which surface active components have a concentration less than 0.1 millimole/litre, and measuring the pressure of the water phase inside the hydrocarbon reservoir.

By means of forming the opening into the reservoir, the exposure of the probe to surface active components when passing the position of the contaminated zone is reduced. Thereby, it is possible to use probe without sealing member covering the openings of the body of the probe, or alternatively use a simple form of sealing member.

According to an embodiment of the invention, wherein, in the second position, said at least one opening of the probe is located at a position inside the reservoir in which a change from an initial water saturation in the reservoir is less than 1%.

According to an embodiment of the invention, wherein, in the second position, said at least one opening of the probe is located at least 10 cm into the reservoir, preferably at least 50 cm into the reservoir 12.

By means of probe comprising the sealing member, the at least one opening is protected from exposure to the surface active components when passing the position of the contaminated zone and instead the sealing member is removed or penetrated once the probe has been arranged in the second position within the reservoir. By means of the sealing member of the probe, the method for pressure measurement of a water phase inside a hydrocarbon reservoir is simplified.

The object of the invention is further obtained by means of use of a probe arrangement and a probe of the probe arrangement according to any of claim 1-13 for a pressure measurement of a water phase inside a hydrocarbon reservoir.

According to an embodiment of the invention, the pressure measurement of the water phase is used for calculating a free water level between the water phase and a hydrocarbon phase of the hydrocarbon reservoir.

According to an embodiment of the invention, the pressure measurement of the water phase is used for calculating a remaining spontaneous imbibition potential of the hydrocarbon reservoir.

BRIEF DESCRIPTION OF DRAWINGS

In the following is described an example of a preferred embodiment illustrated in the accompanying drawings, wherein:

FIG. 1b discloses a detail view of an opening to a pressure measuring chamber in the probe in FIG. 1a;

DETAILED DESCRIPTION

Figure 1A:
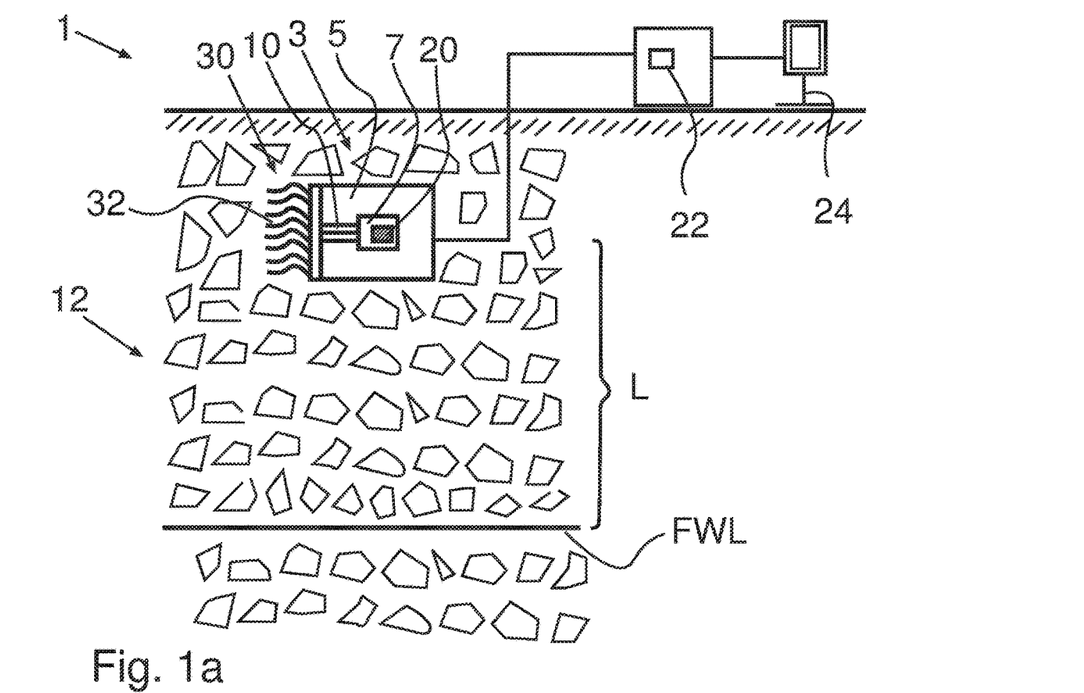
FIG. 1a discloses a probe arrangement comprising a probe according to an embodiment of the invention.

In FIG. 1a a probe arrangement 1 according to an embodiment of the invention is disclosed. The probe arrangement 1 comprises a probe 3. The probe 3 comprises a body 5 comprising a pressure measuring chamber 7 and openings 10 to the pressure measuring chamber 7 for contacting water from the water phase with the pressure measuring chamber 7. Preferably, the probe comprises a plurality of openings 10 leading to the pressure measuring chamber 7 from different directions. However, it shall be understood that a single opening 10 or a plurality of openings 10 may be used. In FIG. 1, the probe 3 is arranged in the rock of a hydrocarbon reservoir 12.

The probe arrangement 1 further comprises a pressure sensor 20 and a logic unit 22. The pressure sensor 20 is arranged in the pressure measuring chamber 7 or in connection with the pressure measuring chamber 7. The pressure sensor 20 is preferably a differential pressure sensor adapted to measure a pressure difference. The pressure measurement may be a force collector type sensor or rely on other known pressure sensor arrangements, such as a piezoresistive strain gauge, a capacitive gauge, an electromagnetic gauge, a piezoelectric gauge, an optical gauge, etcetera.

The logic unit 22 is adapted to receive information from the pressure sensor 20 and determine a pressure Pw of the water in the pressure measuring chamber 7. In the disclosed embodiment, the probe arrangement 1 further comprises means 24 for displaying a determined pressure Pw of the water in the pressure measuring chamber 7, such as a monitor, a LCD display, etcetera. In the disclosed example, the logic unit 22 and the means 24 for displaying are arranged outside the reservoir 12.

The probe 3 is arranged so that at least a portion of a surface of the body 5 at said at least one opening 10 is arranged with a hydrophilic characteristic. In particular the surface of the one or more openings 10 are arranged with a hydrophilic characteristic. According to an embodiment of the invention, the surface further comprises the properties of being non-wetting to oil in the hydrocarbon reservoir 12.

The hydrophilic characteristic is dependent on the properties of the surface and results in that the water phase can be introduced into the pressure measuring chamber 7 even for small sized openings 10. In particular, the hydrophilic characteristic is defined by a surface providing a contact angle between the surface and a droplet that is less than 90 degrees. Vice versa, a hydrophobic characteristic is a surface providing a contact angle between the surface and the droplet that is more than 90 degrees. Likewise, the non-wetting characteristic to oil of the surface of probe 3 is dependent on the properties of the surface and results in that the hydrocarbon phase is prevented from being introduced into the pressure measuring chamber 7.

The probe 3 is preferably arranged with one or more openings 10 comprising each comprising a diameter or equivalent diameter in the range of 0.01-0.000001 mm, preferably 0.01-0.00001 mm, more preferably 0.005-0.00001 mm. Preferably, the body 5 of the probe 3 comprises a permeable material with a plurality of pores, and wherein at least a portion of the pores constitutes said openings 10 to the pressure measuring chamber 7.

By means of use of small sized openings 10 in above range, the accuracy of determination of a free water level FWL of the hydrocarbon reservoir 12 or a remaining spontaneous imbibition potential of a hydrocarbon reservoir 12 can be based on measurements at a single depth in the hydrocarbon reservoir 12.

Preferably, the surface of the body 5 of the probe 3 comprises mainly a wear resistant material, such as a material with a hardness equal or higher than 130 Brinell. Thereby, deformation of the one or more openings 10 when arranging the probe 3 in the hydrocarbon reservoir 12 is prevented.

Preferably, the surface of the body 5 of the probe 3 mainly comprises one of steel and stainless steel or a ceramic material of sufficient hardness.

The probe 3 further comprises a contact arrangement 30 on the surface of the body 5 of the probe 3. The contact arrangement 30 comprises a plurality of flexible elongated members 32 extending away from the surface of the probe 3. The elongated members 32 comprise a fibrous material with an envelope surface provided with the hydrophilic characteristic. The elongated members 32 are adapted to be bent when the probe 3 is inserted in the rock material of the reservoir 12 so that the elongated members 32 find a contact with water phase at an interface surface between rock material in the reservoir. The contact arrangement 30 is accordingly adapted to facilitate the contact of the one or more openings 10 of the probe 3 with the water phase of the reservoir 12.

Figure 1B:
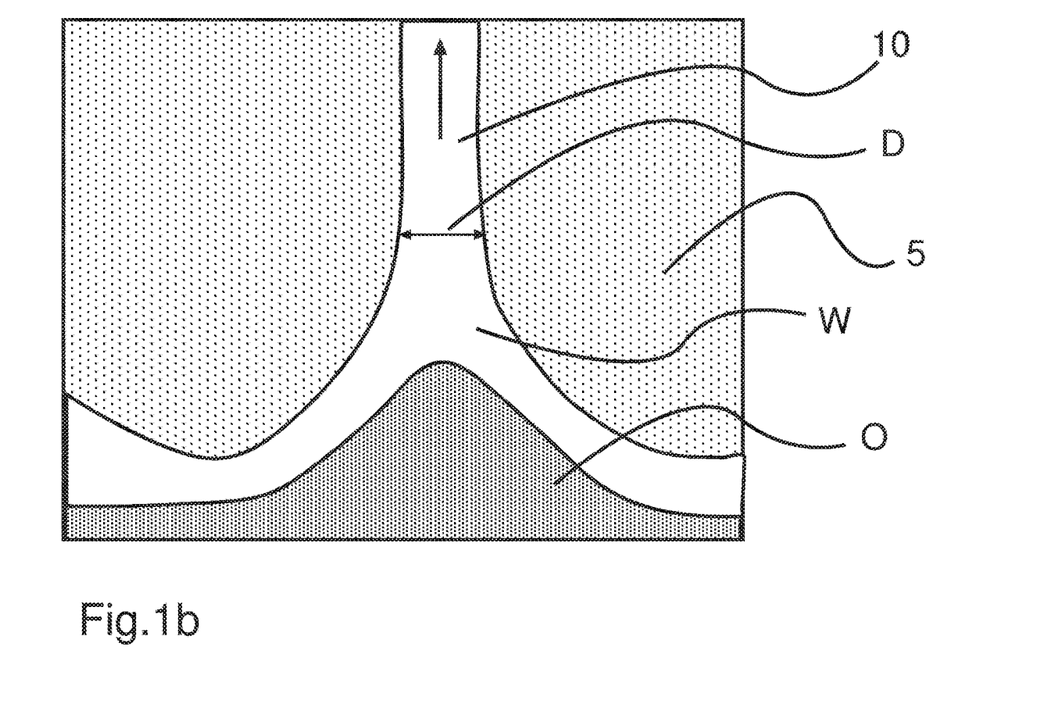

In FIG. 1*b*, an opening 10 of the probe 3 to the pressure measuring chamber 7 is disclosed in further details. When the pressure of the oil phase O is higher than that of the water phase W, oil will try to flow into water filled openings of the porous and permeable probe material. The interface of the oil will curve its interface, but not be able to flow into the opening until the pressure difference is larger than the threshold pressure.

Figure 2:
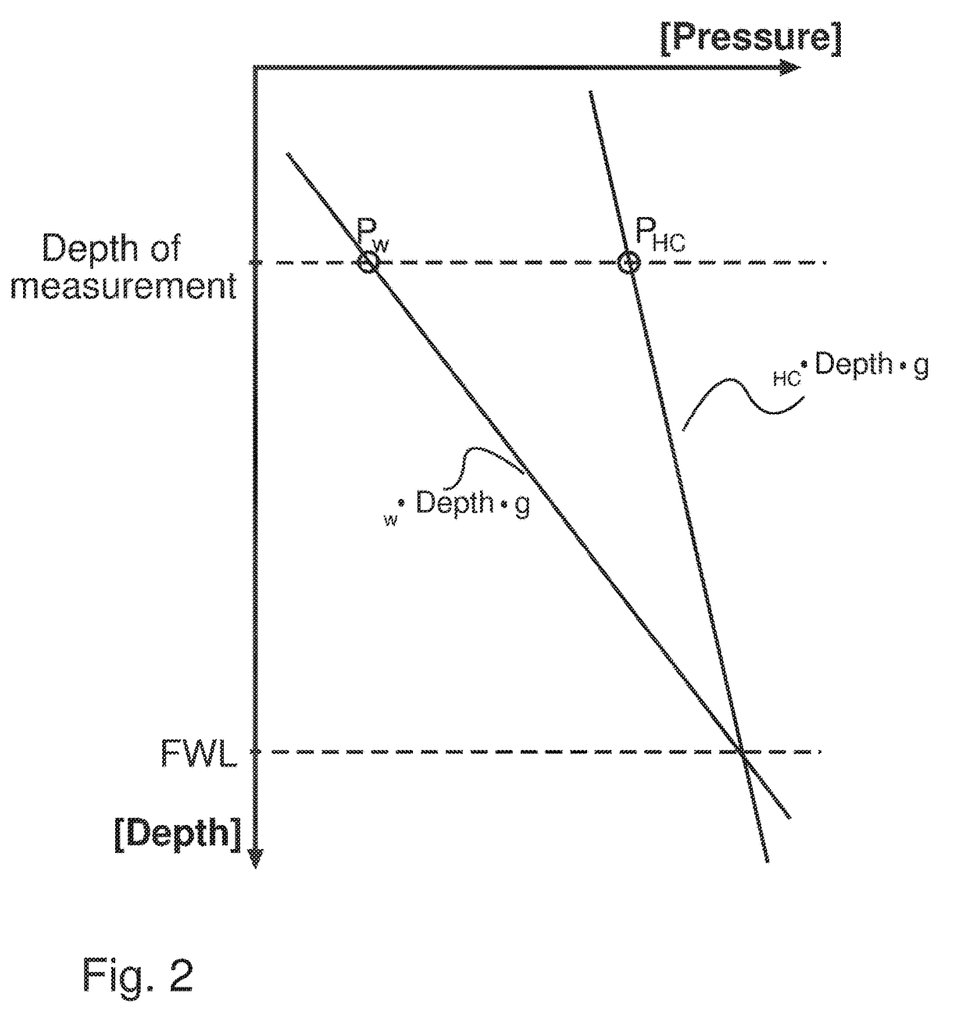
FIG. 2 discloses a schematic view of a graph for determining a free water level of a hydrocarbon reservoir, which graph was constructed based on a pressure measurement of the probe of the invention.

In FIG. 2, a schematic view of a graph for determining a free water level (FWL) of a hydrocarbon reservoir 12 is disclosed. The graph was constructed based on a measured pressure Pw of the water phase by means of the probe 3 of the invention, and a measurement of the pressure of the hydrocarbon phase with a standard probe. Both measurements can be done at the same depth. If the density of the hydrocarbon phase is not known, a fluid sample could be taken to in order to measure this. The pressure of the water phase and the hydrocarbon phase increase with depth according to their densities, or the density of the hydrocarbon phase could be measured in-situ. Water being more dense than the hydrocarbon phase will increase its pressure faster with depth than the hydrocarbon phase. At the free water level (FWL) the pressure of water and the hydrocarbon phase are equal.

Figure 3:
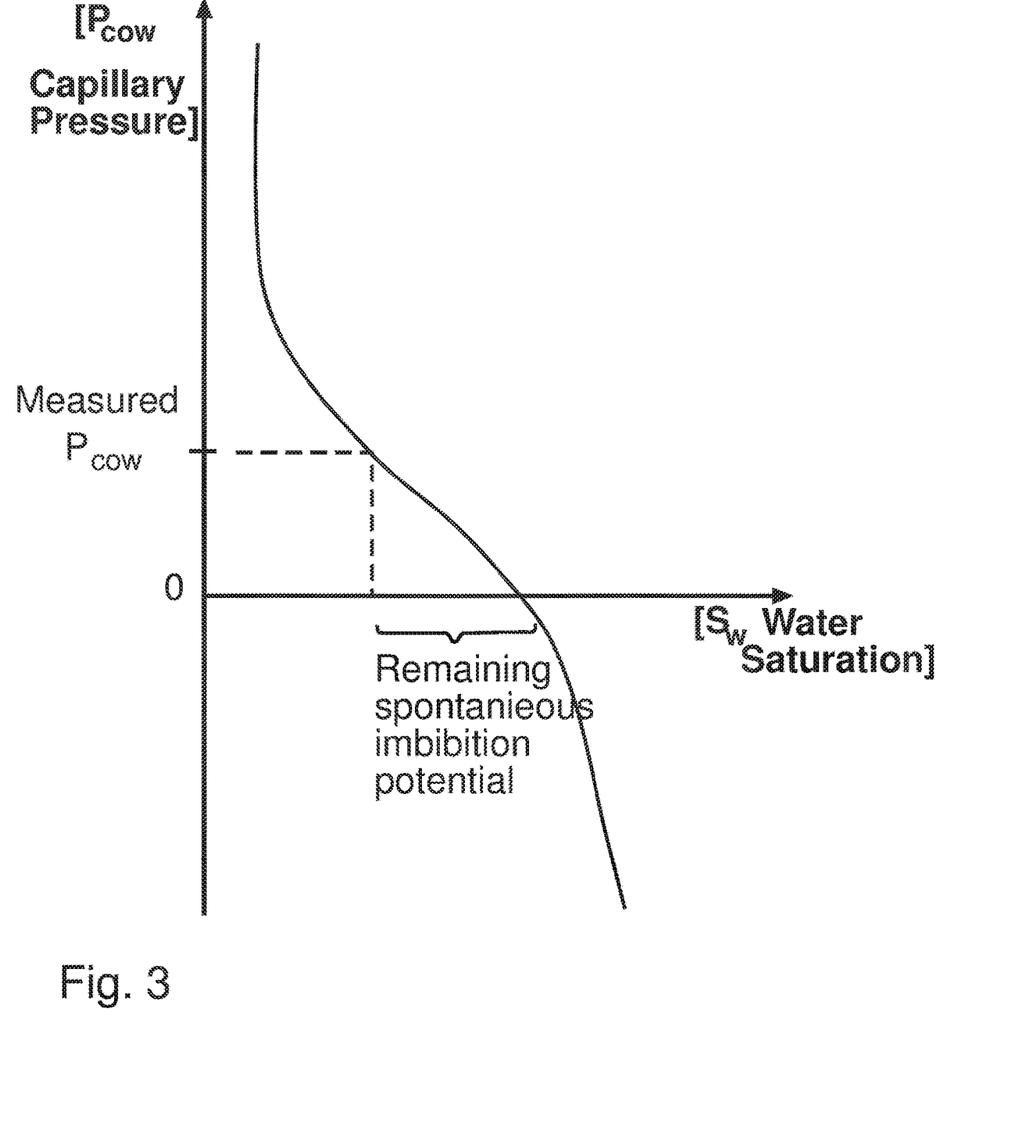
FIG. 3 discloses a schematic view of a graph for determining a remaining spontaneous imbibition potential of a hydrocarbon reservoir, which graph was constructed based on a pressure measurement of the probe of the invention.

In FIG. 3, a schematic view of a graph for determining a remaining spontaneous imbibition potential of a hydrocarbon reservoir 12 is disclosed. The graph was constructed based on a measured pressure Pw of the water phase by means of the probe 3 of the invention. The capillary pressure is here defined as the pressure difference between the non-wetting hydrocarbon phase, and the water phase. Based on laboratory experiments performed on reservoir material (cores) from the reservoir an estimate of the remaining spontaneous imbibition potential.

Figure 4A:
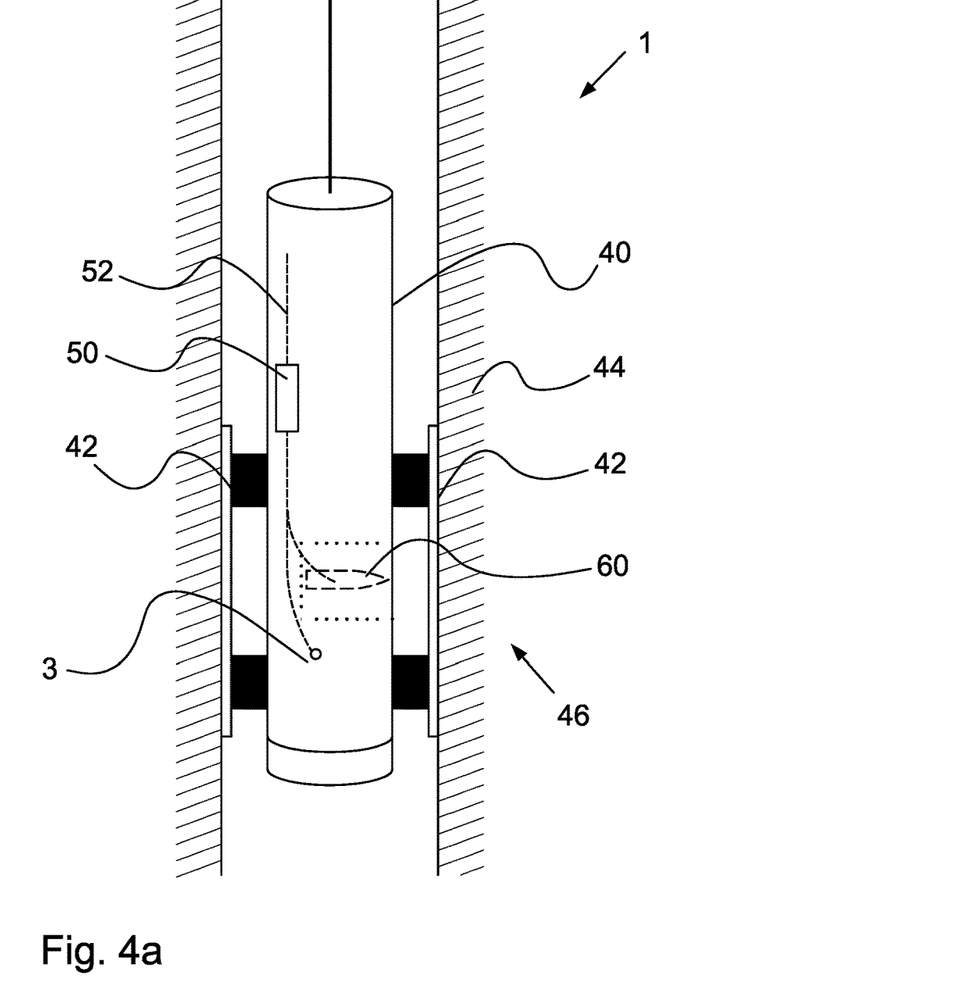
FIG. 4a discloses a probe arrangement in further details according to a further embodiment of the invention, wherein the probe is in a first position.
Figure 5:
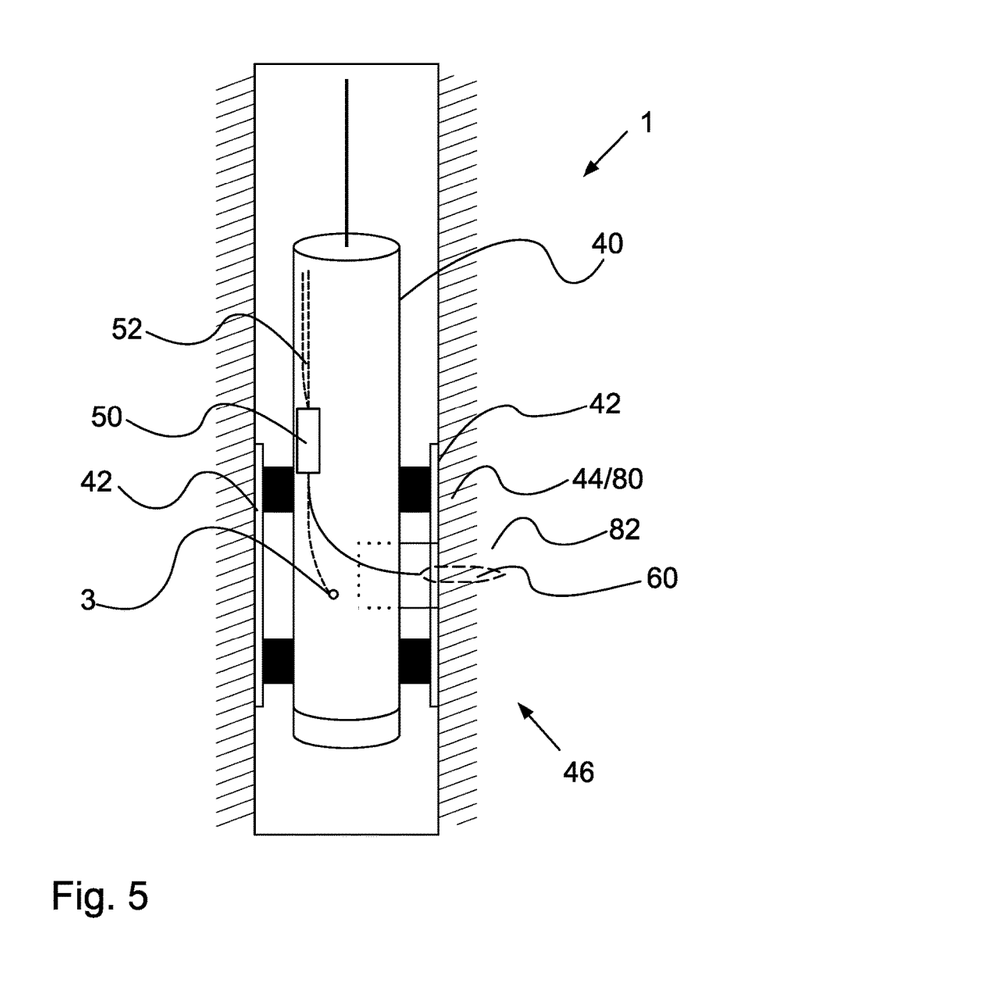
FIG. 5 discloses the probe arrangement in FIG. 4a where a tapered displacement head has been forced into the reservoir.
Figure 6:
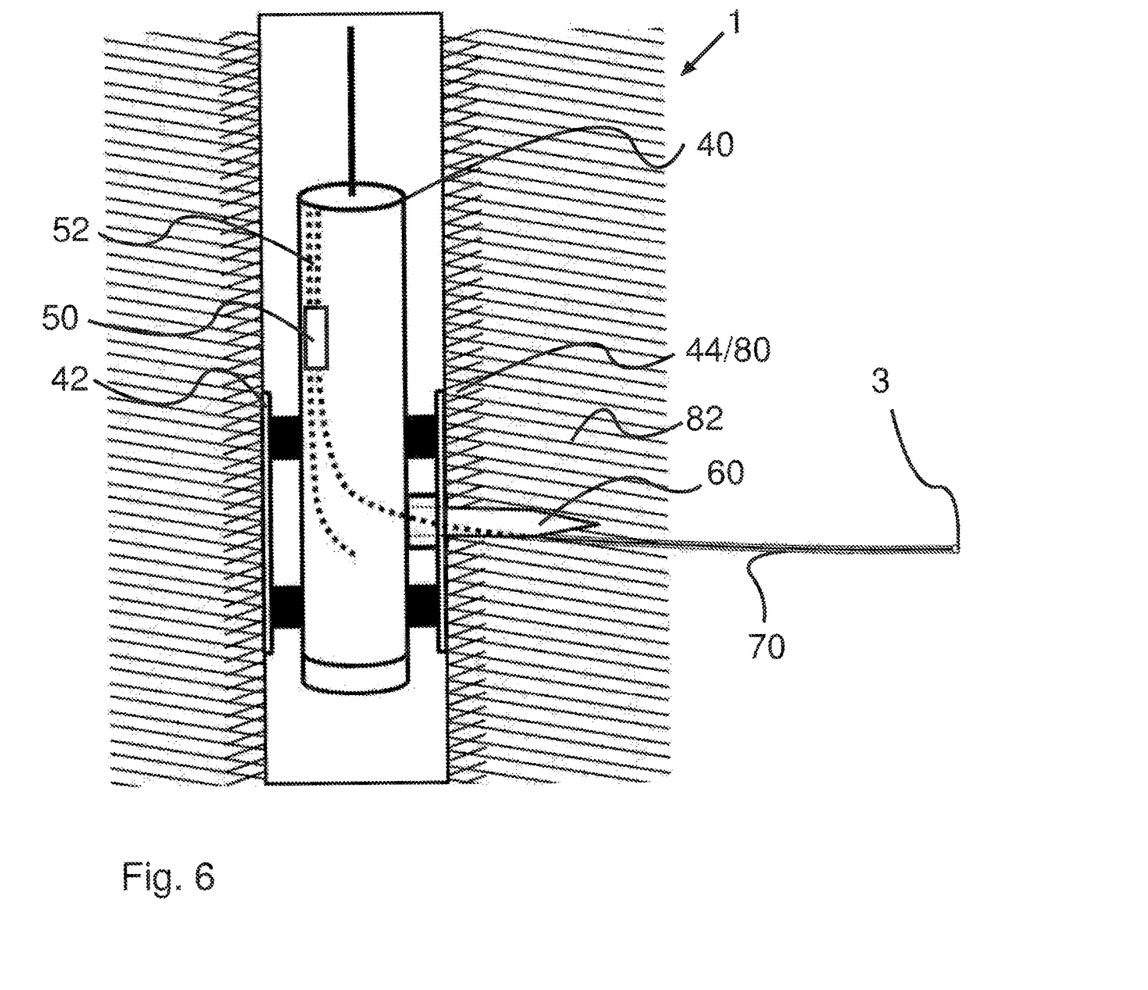
FIG. 6 discloses the probe arrangement in FIG. 4a where a bore has been formed into the reservoir and the probe has been displaced to the second position.

In FIGS. 4*a*, 5 and 6, the probe arrangement 1 is disclosed in conjunction to a well in the reservoir 12. FIG. 6 also discloses the structure of the reservoir 12 at the well, wherein the drilling operation of the well has created a contaminated zone 80 in which surface active components have a concentration equal to or more than 0.1 millimole/litre. The surface active components in the contaminated zone 80 is for example Octadecylamine (15 EO) Quaternary Ammonium Salt (cationic surfactant), Imidazoline (cationic surfactant), Coco Dimethyl Quat (cationic surfactant), Sodium C14-16 Alpha Olephin Sulfonate (anionic surfactant), C10 Alcohol (8 EO) Ethoxylate (non-ionic surfactant), and etcetera, or a combination thereof.

The formation of the well has furthermore created a disturbed zone 82 in which water saturation in the reservoir 12 has been disturbed equal or more than 1% of the initial water saturation in the reservoir 12.

In FIG. 4*a* a probe arrangement 1 comprising a probe 3 according to a further embodiment of the invention is disclosed. The probe arrangement 1 comprises a support 40 for holding the probe 3 and further components of the probe arrangement 1 as will be explained in the following.

The probe arrangement 1 comprises an attachment mechanism 42 for providing an attachment of the probe arrangement 1 to the walls 44 of a well in the reservoir 12. In FIG. 4*a*, the probe arrangement 1 has been inserted into the well so that the support 40 is arranged between the walls 44 of the well and the attachment mechanism 42 has established an attachment to the walls 44 of the well.

The probe arrangement 1 further comprises displacement mechanism 46 for displacing the probe 3 from a first position, where said at least one opening 10 of the probe 3 is located outside the reservoir 12, to a second position, where said at least one opening 10 of the probe 3 is located at a position inside the reservoir 12, and in particular to a position in which surface active components have a concentration less than 0.1 millimole/litre. Accordingly, the displacement mechanism 46 is adapted to displace the probe 3 to a position beyond the contaminated zone 80 in which surface active components are available at a concentration less than would deteriorate the hydrophilic characteristic of the probe 3.

Furthermore, as will be explained in the following, the second position is a position in which the initial water saturation in the reservoir 12 has been changed less than 1%. Accordingly, the displacement mechanism 46 is adapted to displace the probe 3 through the contaminated zone 80 and the disturbed zone 82 of the reservoir 12, see FIG. 6.

The probe arrangement 1 further comprises drilling mechanism 50 for forming an opening in the reservoir 12. In the disclosed embodiment the support comprises two guide paths 52, a first path for a displacing a drilling element of the drilling mechanism 50 and a second path for displacing the probe 3 from a first position to a second position. The first path and the second path are indicated by dotted lines.

Preferably, the drilling mechanism 50 further comprises a container containing fluid and means for introducing the fluid into the bore formed by the drilling mechanism 50 and removing the fluid together with residual material from the bore. The fluid is insoluble or essentially insoluble in water, such as oil. The container and the means for introducing the fluid are not disclosed in the figures.

The probe arrangement 1 further comprises a tapered displacement head 60 adapted to be inserted and retracted from the reservoir 12. The displacement head 60 is adapted to be forced into the reservoir 12 so that the displacement head 60 passes through the contaminated zone 80 of the reservoir 12, see FIG. 4b.

Figure 4B:
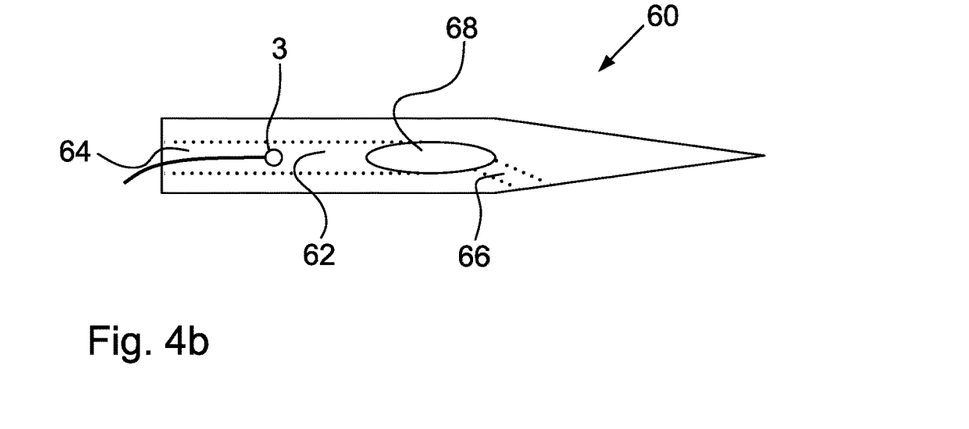
FIG. 4b discloses a tapered displacement head enclosing the probe to be displaced from the first position to the second position.

The tapered displacement head 60 comprises an inner room 62 adapted to enclose the probe 3, and a first passage 64 to the inner room 62. The displacement head 60 also comprises a second passage 66 from the inner room 62 to an outside. The displacement head 60 further comprises a sealing member 68 between the inner room 62 and the second passage 66. The sealing member 68 is adapted to prevent surface active components to enter the inner room 62 when the displacement head 60 is forced through the contaminated zone 80 of the reservoir 12. Accordingly, the probe 3 is protected from contact with the surface active components during such displacement of the displacement head 60.

After that the displacement head 60 has been forced into the reservoir 12 beyond the contaminated zone 80, the sealing member 68 is removed or penetrated to enable contact with the reservoir 12.

Thereafter, the probe 3 can be introduced into the reservoir 12. Alternatively, as shown in the embodiment in FIG. 6, the drilling mechanism 50 forms a bore 70 into the reservoir 12 in order to pass through a disturbed zone 82 of the reservoir 12. Thereafter, the probe 3 is displaced into the bore 70 and to the end of the bore 70 until reaching contact with the reservoir 12, whereupon pressure measurement of a water phase inside a hydrocarbon reservoir 12 can executed.

The displacement head 60 has accordingly the function of an enclosure for the probe 3 and the drilling mechanism 50. The displacement head 60 is rigid arranged comprising a material allowing it to be forced into the reservoir 12. For example, the displacement head 60 comprises a metallic material, such as stainless steel, aluminium, etc. The displacement head 60 is tapered arranged, such as wedge shape, in order to facilitate it to be forced into the reservoir 12.

Figure 4C:
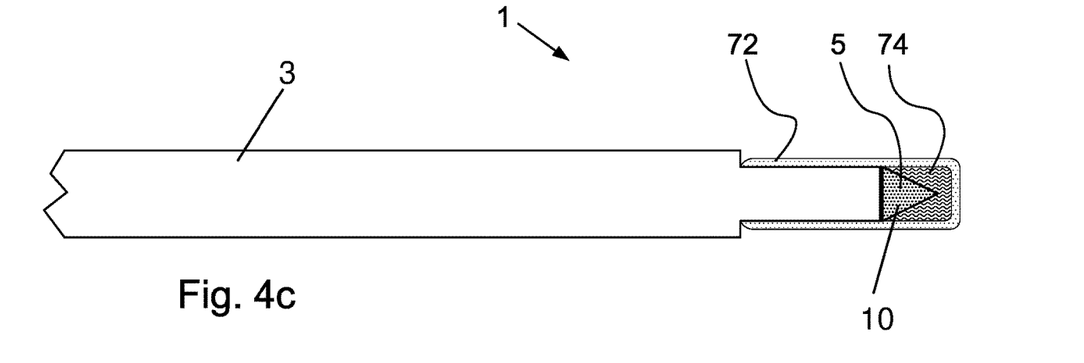
FIG. 4c discloses a probe of the probe arrangement in FIG. 4a according to an embodiment of the invention.

In FIG. 4c a probe 3 of the probe arrangement 1 in FIG. 4a according to an embodiment of the invention is disclosed. The probe 3 comprises a further sealing member 72 comprising a casing that extends over the at least one opening 10 at the body 5 of the probe 3. The casing comprises for example mainly a glass material that is adapted to be broken when the probe 3 is brought into contact with the reservoir 12. The further sealing member 72 configured to protect the at least one opening 10 from exposure to surface active components at a concentration equal to or higher than 0.1 millimole/litre.

In the disclosed embodiment, the further sealing member 72 is arranged to form a spacing between the body 5 of the probe 3, and the spacing is filled with flowable suspension 74 with hydrophilic properties. Preferably, the flowable suspension 74 mainly comprises a granular combination of kaolinite and water. The flowable suspension 74 facilitates establishing contact between the at least one opening 10 of the probe 3 and the reservoir 12 for the purpose of the pressure measurements.

According to an embodiment of the invention, FIG. 6 will now be discussed in further details. FIG. 6 discloses the probe arrangement 1 in FIG. 4a where the probe 3 has been displaced from the first position to the second position.

As seen in FIG. 6, the probe 3 has been displaced from the first position inside the well to the second position inside the reservoir 12. In particular, it is seen that the probe 3 has been displaced to a second position where the probe 3 or the at least one opening 10 of the probe 3 is located inside the reservoir 12 separated from the contaminated zone 80 and the disturbed zone 82. Thereby, the probe arrangement 1 enables accurate pressure measurement of a water phase inside a reservoir 12.

Figure 7A:
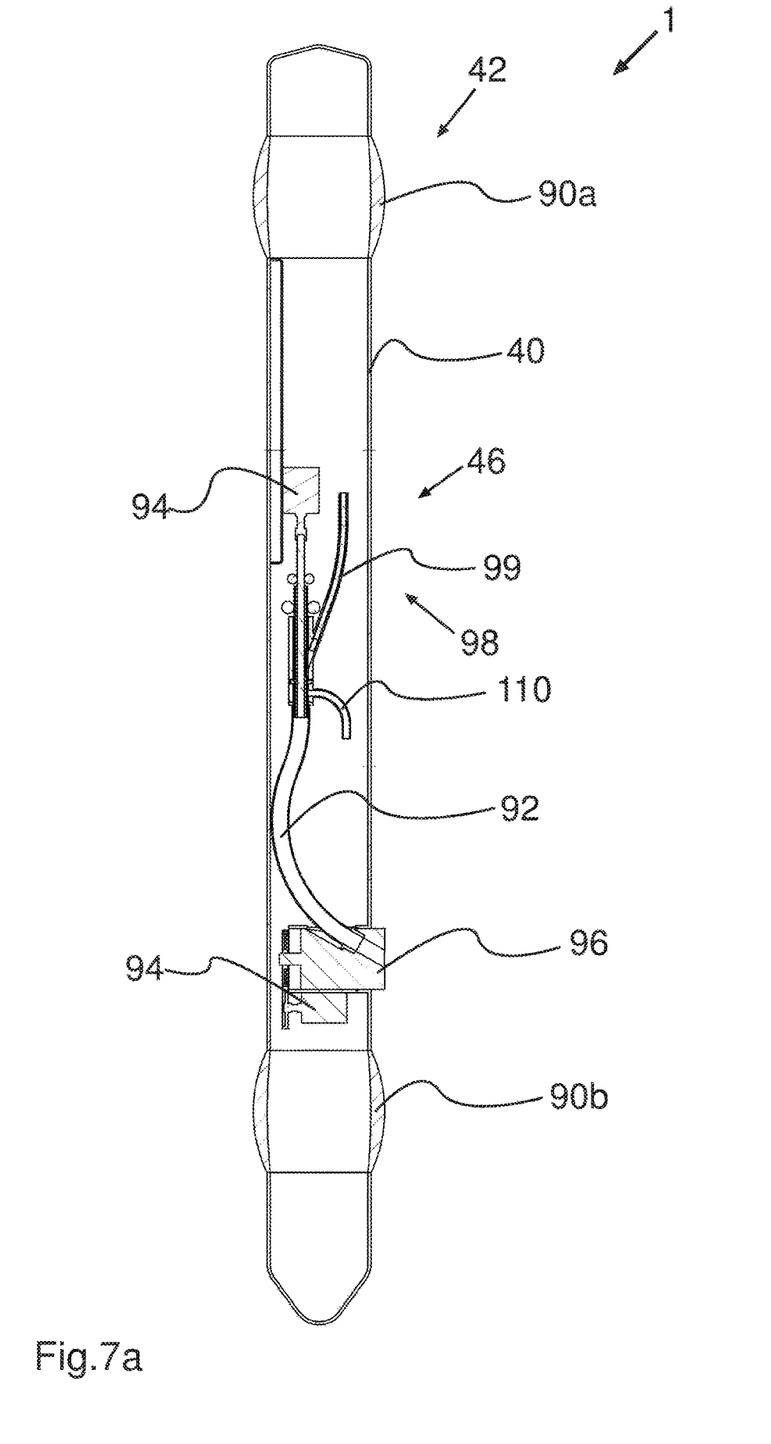
FIG. 7a discloses a probe arrangement according to a yet another embodiment of the invention.
Figure 7B:
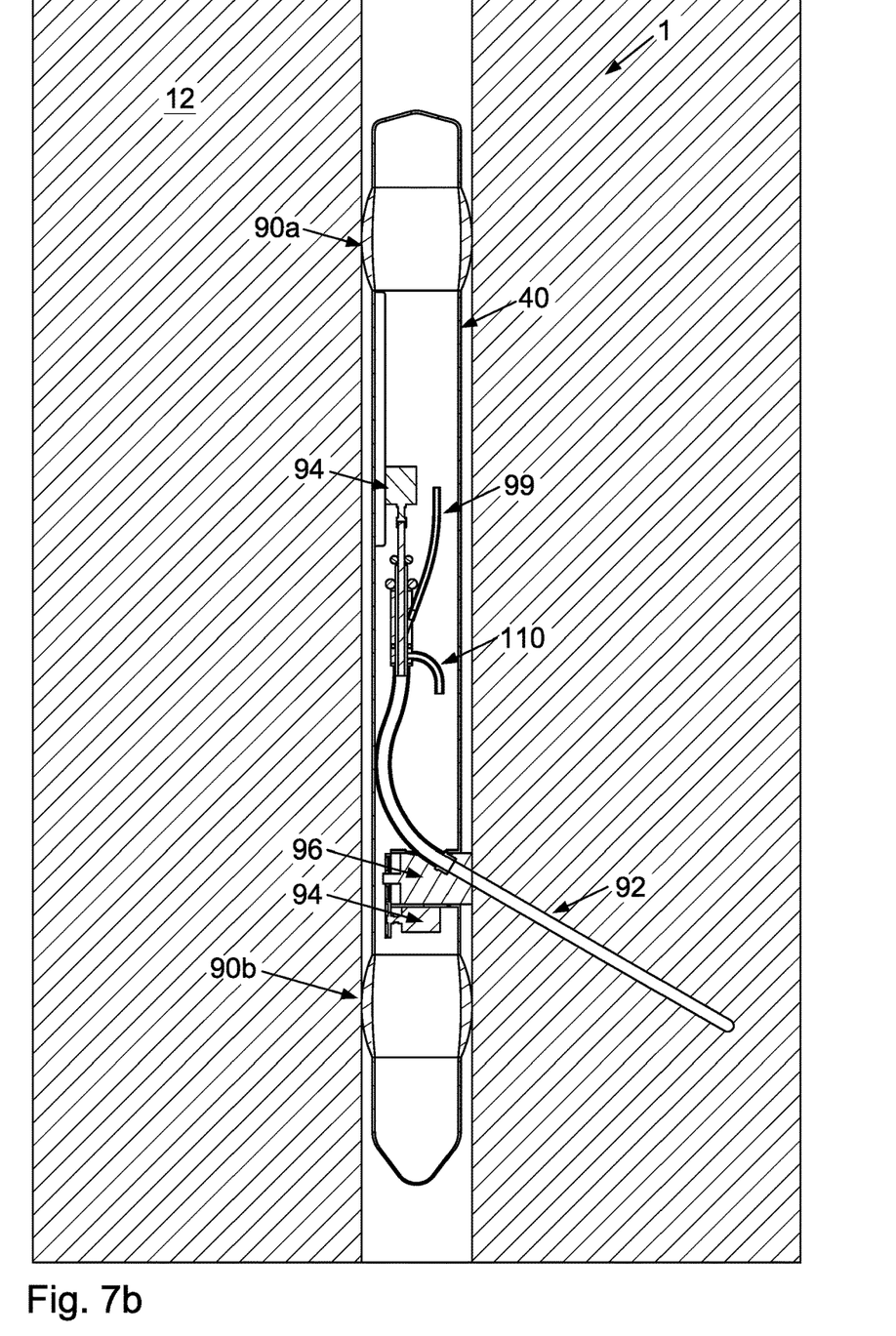
FIG. 7b discloses a probe arrangement in FIG. 7a arranged in a reservoir.

In FIG. 7a is a probe arrangement 1 according to a yet another embodiment of the invention disclosed. In FIG. 7b, the probe arrangement 1 in FIG. 7a is seen positioned in the well in the formation.

The probe arrangement 1 in FIG. 7a differs from the probe arrangement in FIGS. 5 and 6 in that the attachment mechanism 42 comprises a first inflatable packer 90a and a second inflatable packer 90b arranged on opposite sides of the displacement mechanism 46. The packers 90a, 90b have the function of firmly attaching the support 40 is a stable position in the well at the reservoir 12 by means of that the packers 90a, 90b are inflated until engaging with the walls of the well.

The probe arrangement 1 comprises a drilling mechanism 50 as will be explained in further details in connection to FIGS. 8a and 8b. The displacement mechanism 46 comprises a guide pipe 92 for a drill string 100 of the drilling mechanism 50 and the probe 3. The guide pipe 92 has the function to guide the drilling mechanism 50 and the probe 3 into the desired direction in the reservoir 12.

The drilling mechanism 50 comprises one or more motor units 94. In the disclosed embodiment, the drilling mechanism 50 comprises two motor units 94 in form of electric motors. The drilling mechanism 50 further comprises a piston 96 provided with a gasket that is adapted to extend towards the reservoir 12 and seal against the wall of the well in the reservoir 12.

The probe arrangement 1 further comprises a probe holder 98 for holding the probe 3 separated from exposure with operation of the drilling mechanism 50. The probe holder 98 comprises a guide channel 99 extending to the guide pipe 92.

Figure 8A:
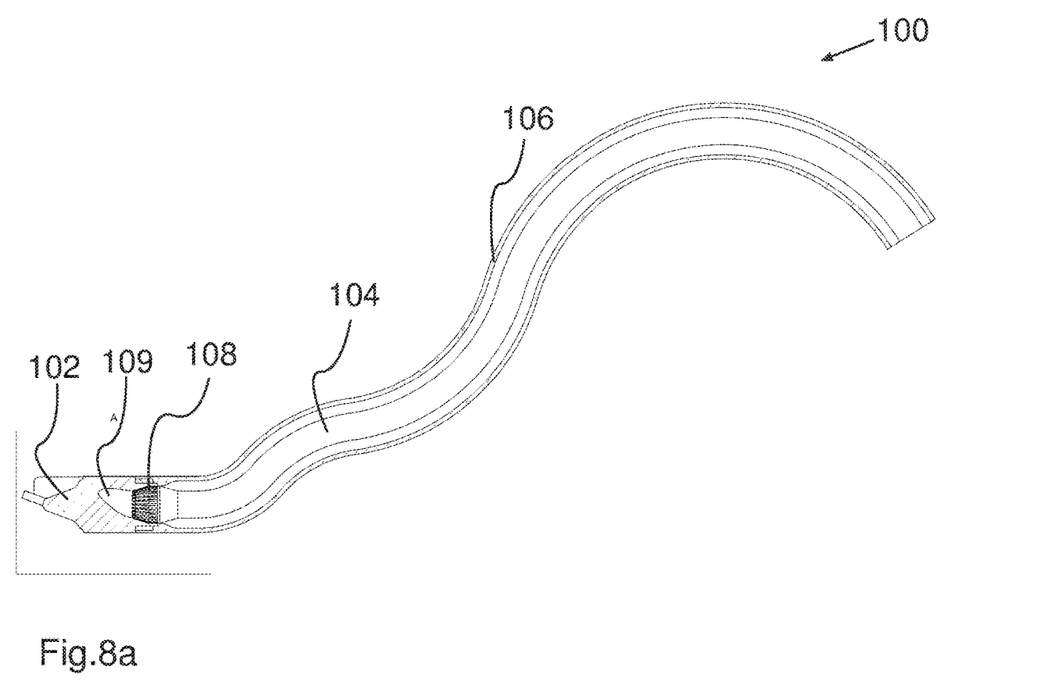
FIG. 8a discloses a drilling mechanism according to an embodiment of the invention.
Figure 8B:
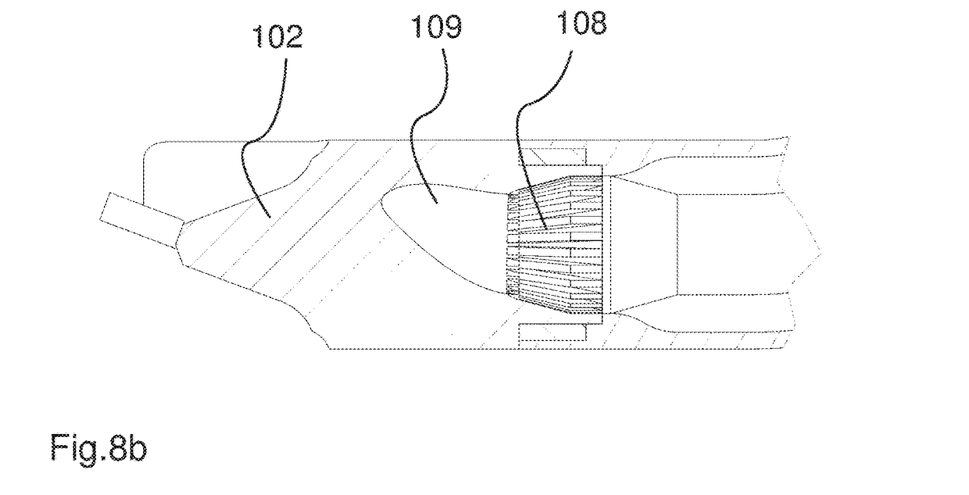
FIG. 8b discloses the drilling mechanism in FIG. 8a in further details.

With reference to FIGS. 8a and 8b, the drilling mechanism 50 will now be explained in further details. The drilling mechanism 50 comprises a drilling string 100, in particular a micro drill string, as is seen in FIG. 8a.

The drilling string 100 comprises a drill bit 102 and drive wire 104 adapted to be set into rotation in order to drive a rotation of the drill bit 102. The drill bit 102 is disclosed in further details in FIG. 8b. The drive wire 104 is made of a material that is flexible, strong and capable of transferring momentum at high rotation over sufficient length. The drive wire 104 is for example a speedometer wire.

In the disclosed embodiment, the drill string 100 comprises a casing pipe 106 adapted to guide the drill bit 102 and the drive wire 104. The casing pipe 106 has also the function of guiding drill fluid to the drill bit 102 and through an opening 109 in the drill bit 104 and away from the drill bit 102 for removing drilling debris formed during the drilling operation. The drilling mechanism 50 further comprises a discharge pipe 110 for discharging used drilling fluid containing drilling debris, see FIG. 7a. The drive wire 104 is arranged extendable and retractable within the casing pipe 106.

The drilling string 100 further comprises a clutch connection 108 between the drive wire 104 and the drilling bit 102 for transferring power from the drive wire 104 to the drilling bit 102. The drill bit 102 is connected to the casing pipe 106 by means of a needle bearing.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A probe arrangement for pressure measurement of a water phase inside a hydrocarbon reservoir, the probe arrangement comprising a probe comprising a body with a pressure measuring chamber and at least one opening to the pressure measuring chamber for contacting water from the water phase with the pressure measuring chamber, wherein:
at least a portion of a surface of the body at said at least one opening is arranged with a hydrophilic characteristic,
the at least one opening comprises a diameter or equivalent diameter in the range of 0.01-0.000001 mm, and
the probe arrangement further comprises a displacement mechanism adapted to displace the probe from a first position, where said at least one opening of the probe is located outside the reservoir, to a second position, where said at least one opening of the probe is located at a position inside the reservoir.

2. The probe arrangement according to claim 1, wherein, in the second position, said at least one opening of the probe is located at a position inside the reservoir.

3. The probe arrangement according to claim 1, wherein the probe arrangement comprises a tapered displacement head comprising an inner room adapted to enclosing the probe, a first passage to the inner room and a second passage out of the inner room into the reservoir and a sealing member for sealing an opening of said second passage, wherein the displacement head is adapted to be forced into the reservoir and thereby forming an opening in the reservoir.

4. The probe arrangement according to claim 1, wherein the probe arrangement comprises a drilling mechanism for forming an opening in the reservoir.

5. The probe arrangement according to claim 4, wherein the drilling mechanism comprises means for introducing a fluid into the opening and removing the fluid together with residual material from the opening, which fluid is insoluble in water.

6. The probe arrangement according to claim 1, wherein the at least one opening to the pressure measuring chamber is saturated and filled with water.

7. The probe arrangement according to claim 1, wherein the at least one opening comprises a diameter or equivalent diameter in the range of 0.01-0.00001 mm.

8. A probe arrangement for pressure measurement of a water phase inside a hydrocarbon reservoir, the probe arrangement comprising:
a probe comprising a body with a pressure measuring chamber and at least one opening to the pressure measuring chamber for contacting water from the water phase with the pressure measuring chamber, wherein at least a portion of a surface of the body at said at least one opening is arranged with a hydrophilic characteristic, wherein the at least one opening comprises a diameter or equivalent diameter in the range of 0.01-0.000001 mm;
a displacement mechanism adapted to displace the probe from a first position, where said at least one opening of the probe is located outside the reservoir, to a second position, where said at least one opening of the probe is located at a position inside the reservoir; and
a seal configured to cover said at least one opening from exposure to surfactants.

9. The probe arrangement according to claim 8, wherein the protecting sealing member comprises a casing extending over said at least one opening and comprising a glass material.

10. The probe arrangement according to claim 8, wherein the probe comprises a spacing between the protecting sealing member and the surface of the body of the probe, and wherein the probe comprises a flowable suspension with hydrophilic properties arranged in said spacing.

11. The probe arrangement according to claim 10, wherein the flowable suspension mainly comprises a granular combination of kaolinite and water.

12. A method for pressure measurement of a water phase inside a hydrocarbon reservoir by a probe arrangement according to claim 1, the method comprising:
forming an opening into the reservoir by forcing a tapered displacement head into the reservoir, and
removing or penetrating the seal,
introducing the probe into the reservoir by displacing the probe from the first position, where said at least one opening of the probe is located outside the reservoir, to the second position, where said at least one opening of the probe is located at a position inside the reservoir, and
measuring the pressure of the water phase inside the reservoir.

13. The method according to claim 12 further comprising:
forming a protection opening into the reservoir by a drilling mechanism, and
introducing the probe into the protection opening and into the reservoir.

* * * * *

UNITED STATES PATENT AND TRADEMARK OFFICE
CERTIFICATE OF CORRECTION

PATENT NO. : 11,035,222 B2  
APPLICATION NO. : 16/465108  
DATED : June 15, 2021  
INVENTOR(S) : Trond Arne Rolfsvåg Page 1 of 1

It is certified that error appears in the above-identified patent and that said Letters Patent is hereby corrected as shown below:

In the Specification

In Column 1, Line 4, insert -- Cross-Reference to Related Applications
This application is the U.S. National Phase under 35. U.S.C. § 371 of International Application PCT/NO2017/050308, filed Nov. 29, 2017, which claims priority to Norwegian Patent Application No. 20161910, filed Nov. 30, 2016. The disclosures of the above-described applications are hereby incorporated by reference in their entirety. --.

In the Claims

In Column 13, Line 22, delete "The invention claimed is:" and insert -- What is claimed is: --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*